US007372645B2

(12) United States Patent

Van Schaik et al.

(10) Patent No.: US 7,372,645 B2
(45) Date of Patent: May 13, 2008

(54) OBSERVATION DEVICE

(75) Inventors: Sander Willem Van Schaik, Utrecht (NL); Cornelis Johannes Janson, Eindhoven (NL)

(73) Assignee: Robert Bosch GmbH, Eindhoven (NL)

( * ) Notice: Subject to any disclaimer, the term of this patent is extended or adjusted under 35 U.S.C. 154(b) by 625 days.

(21) Appl. No.: 10/507,118

(22) Filed: Sep. 10, 2004

(65) Prior Publication Data

US 2007/0201862 A1 Aug. 30, 2007

(51) Int. Cl.
*G02B 7/02* (2006.01)

(52) U.S. Cl. ...................... 359/811; 359/819; 348/143; 348/151

(58) Field of Classification Search ................ 359/811; 348/143, 151, 373; D16/203; 396/427
See application file for complete search history.

(56) References Cited

U.S. PATENT DOCUMENTS 3,819,856 A 6/1974 Pearl et al.
4,920,326 A 4/1990 Argarwala
4,920,357 A 4/1990 Johnson
4,920,367 A 4/1990 Pagano
5,851,442 A * 12/1998 Spector ....................... 261/30
6,525,766 B1 * 2/2003 Ikoma et al. ............... 348/151
6,527,000 B1 * 3/2003 Randmae et al. .......... 134/99.1
2001/0022627 A1 9/2001 Bernhardt
2002/0140850 A1 * 10/2002 Toste et al. ................. 348/375

FOREIGN PATENT DOCUMENTS

EP 1136964 A2 9/2001

* cited by examiner

*Primary Examiner*—Timothy Thompson
(74) *Attorney, Agent, or Firm*—Foley & Lardner LLP

(57) ABSTRACT

An observation device includes a housing and an optical lens having a field of view. The housing includes an outer dome having at least one transparent portion and an inner dome. The optical lens is accommodated within the housing. The outer dome is transparent in the field of view of the lens and is configured to protect the lens. The observation device is resistant to impact by an object with a maximum impact energy of a first magnitude. A like observation device, but lacking an inner dome, is resistant to impact by the object with a maximum impact energy of a second magnitude. The ratio between the first magnitude and the second magnitude is at least 1.1.

20 Claims, 3 Drawing Sheets

OBSERVATION DEVICE

BACKGROUND

An observation device comprising an inner dome is known from European patent application EP 1136 964 A2 and from U.S. Pat. No. 3,819,856.

Cameras comprising at least an outer dome are generally used as observation cameras, in particular attached to a ceiling, with the outer dome functioning to protect the lens. Considering the nature of the use of such cameras, it is at least desirable or even necessary for such cameras to be vandal-proof. This implies that the outer dome must be resistant to a certain extent to impact with or by an object, such as a club or the like, so that the deformation that the outer dome undergoes as a result of such impact will be so small that the lens does not come into contact with the inner side of the outer dome and/or of the inner dome, for example, in which case the camera may require some form of repair as a consequence of the impact but continues to function as such.

In order to comply with this wish/requirement, the diameter of the outer dome is generally selected so large that there is a considerable spacing between the inner side of the outer dome and the lens. Thus the outer dome can deform to a large extent without the lens being touched. This solution to the problem as described above is contrary to the general wish/requirement to make the cameras small and compact so that they will be as inconspicuous as possible. After all, practice teaches that the less conspicuous a camera is, the less vandals will be inclined to test the camera's resistance to vandalism. In addition to that, thicker outer domes generally result in greater image distortion.

An alternative solution to increasing the resistance of cameras to vandalism is to user a thicker material for the outer dome. Apart from the fact that this leads to a relatively great increase of the manufacturing costs of such outer domes, it has become apparent that it may have a contrary effect on the impact-resistance, because the internal stresses that occur upon impact will be higher, which may lead to unacceptable failure of the outer dome.

The camera as described in U.S. Pat. No. 3,819,856 comprises an outer dome as well as an inner dome. The reason for using two domes for each camera as described in the aforesaid two documents is to provide a visual screen for the lens, so that it will be difficult for persons to detect the direction of the scanning beam and thus find out if they are in the camera's field of view. The outer dome in EP 1 136 964 A2 functions to provide a universal screen for different types of cameras.

From U.S. Pat. No. 4,920,326 there is known a surveillance camera comprising a substantially spherical housing. The housing substantially comprises an upper dome and a lower dome. The upper dome is formed of three layers, viz. an outer layer of a rubber-containing plastic alloy having good ballistic properties, an acrylic intermediate layer, and an aluminum inner layer. The lower dome comprises the same three layers, with two transparent polycarbonate layers additionally being present on the inner side and on the outer side. Pop rivets are provided to keep the transparent polycarbonate layers and the three layers present therebetween together. On the outside, the lower dome is finally provided with a methyl acrylate cover. The scanning beam passes through the two transparent polycarbonate layers and through the methyl acrylate layer, and air is present between the three layers. A very important drawback of the known observation device is the constructional complexity thereof, as a result of which the manufacture of the various parts and the assembly thereof will be time-consuming and costly. Another important drawback is the use of the large number of dome layers, resulting in a loss of light with the attendant risk of significant refraction of the light. Moreover, it is difficult to gain access to the interior of the observation device.

SUMMARY

The invention relates to an observation device comprising a housing, an optical lens with a field of view, which is accommodated within the housing, said housing comprising an outer dome which is transparent, at least in the field of view of the lens, for protecting the lens, and an inner dome disposed within the outer dome, the observation device having the above construction being resistant to impact by an object with a maximum impact energy of a first magnitude, and the observation device not fitted with an inner dome being resistant to impact by said object with a maximum impact energy of a second magnitude.

Within the framework of the invention, said first and second magnitudes must be determined on the basis of the IEC 60068-2-75 (Part 2) standard, wherein use is made of a falling object having a specific energy content. At the magnitude of the energy content at which a camera fails, i.e. no longer functions after the impact, the camera must be considered not to be resistant to impact by the object in question.

The object of the invention is to provide, whether or not in preferred embodiments thereof, a camera that exhibits an increased impact-resistance. More in particular it is an object of the invention to provide a constructionally simple camera of relatively small dimensions. In order to accomplish that object, the observation device according to the invention is in the first place characterized in that the proportion between the first magnitude and the second magnitude is at least 1.1. With such a proportion, the inner dome contributes significantly to the impact-resistance of the observation device. Thus the inner dome is given a new function in comparison with prior art cameras that are fitted with an inner dome, whilst in addition the inner dome's function to hide the lens from a view as much as possible can be retained. Within the framework of the invention, the maximum impact energy is to be determined in accordance with the aforesaid IEC 60068-2-75 (part 2) standard.

In a more specific preferred embodiment of the observation device according to the invention, ratio between said first magnitude and said second magnitude is at least 1.1, more preferably at least 1.2, even more preferably at least 1.4, and may be as high as at least 1.5. As a result of ratio between the impact energies, the inner dome contributes significantly to the impact-resistance.

Since the thickness of the material of the outer dome is maximally 5.0 mm in a preferred embodiment, not only the extent of image distortion of the camera is kept within bounds as much as possible, but in addition the occurrence of high internal stresses upon impact in the case of vandalism, which may lead to unacceptable failure of the outer dome, is prevented. By further not making the outer dome too thick, a light, small and compact observation device according to the invention may be obtained. Furthermore it is possible with this preferred embodiment to produce the outer dome in a way which is industrially/economically well-founded.

Especially these latter aspects are further enhanced in that, more specifically, a minimum spacing is used between the outer side of the inner dome and the inner side of the outer dome, in any case a spacing which preferably does not exceed 5.0 mm. Thus the outer dome is already supported by the inner dome upon minor deformation in inward direction in the case of an impact.

According to the invention, the wall of the inner dome may be provided with thickened portions so as to strengthen the inner dome. Said thickened portions may be in the form of edges extending crosswise or in the longitudinal direction of the dome. The thickened portions may be present on the inner side as well as on the outer side of the inner dome.

An improved functionality of the observation device according to the invention can be obtained by providing the observation device with means for manipulating the lens, which means, in a more specific embodiment thereof, are furthermore arranged for joint manipulation of the lens and the inner dome.

The observation device according to the invention may in that case be provided with driving means for driving the manipulation means.

In a specific embodiment, the observation device may be constructed in such a manner that the lens is elastically connected to the manipulation means.

In an embodiment, the inner dome has a closed surface also at the field of view, at which location the inner dome must be transparent to the scanning beam, of course. A closed surface of the inner dome imparts a high degree of stiffness to the inner dome, so that the inner dome can significantly contribute to the impact-resistance of the observation device.

Alternatively it may be very advantageous for the inner dome to comprise a free passage in the field of view. Thus the inner dome will not cause any loss of light or undesirable refraction of the light that might have an adverse effect on the quality of the obtained image.

The inner dome may also contribute significantly to the impact resistance of the observation device if the inner dome, according to a further preferred embodiment of the invention, is at least partially made of a metal. Cast aluminium is a highly suitable metal in this regard. Within the framework of the present invention it is also possible, of course, to use other suitable materials for the inner dome, such as (transparent) polycarbonate or ABS.

In a highly preferred embodiment, the inner dome consists of one layer. The use of several layers might lead to additional loss of light and additional refraction of light rays, whilst in addition the production of a dome consisting of several layers is more complex and will consequently lead to higher costs, which is objectionable, of course, if the observation devices are to be produced on an industrial scale.

The same considerations apply as regards the outer dome. In another preferred embodiment, the outer dome consists of one layer, therefore.

The inner dome is preferably arranged for being manipulated relative to the outer dome, so that the position of the inner dome can be adapted to the lens, more specifically to the field of view thereof, without manipulation of the outer dome being required. As a result, manipulation of the inner dome and of the lens cannot (easily) be detected from the outside.

From a constructional point of view it is strongly preferred for the housing to comprise a base element, to which the outer dome can be attached by means of a threaded connection along a circumferential portion of the outer dome. Access to the interior of the housing can thus be gained in a simple manner by simply unscrewing the outer dome.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Like parts will be indicated by the same numerals in the description below.

Figure 1:
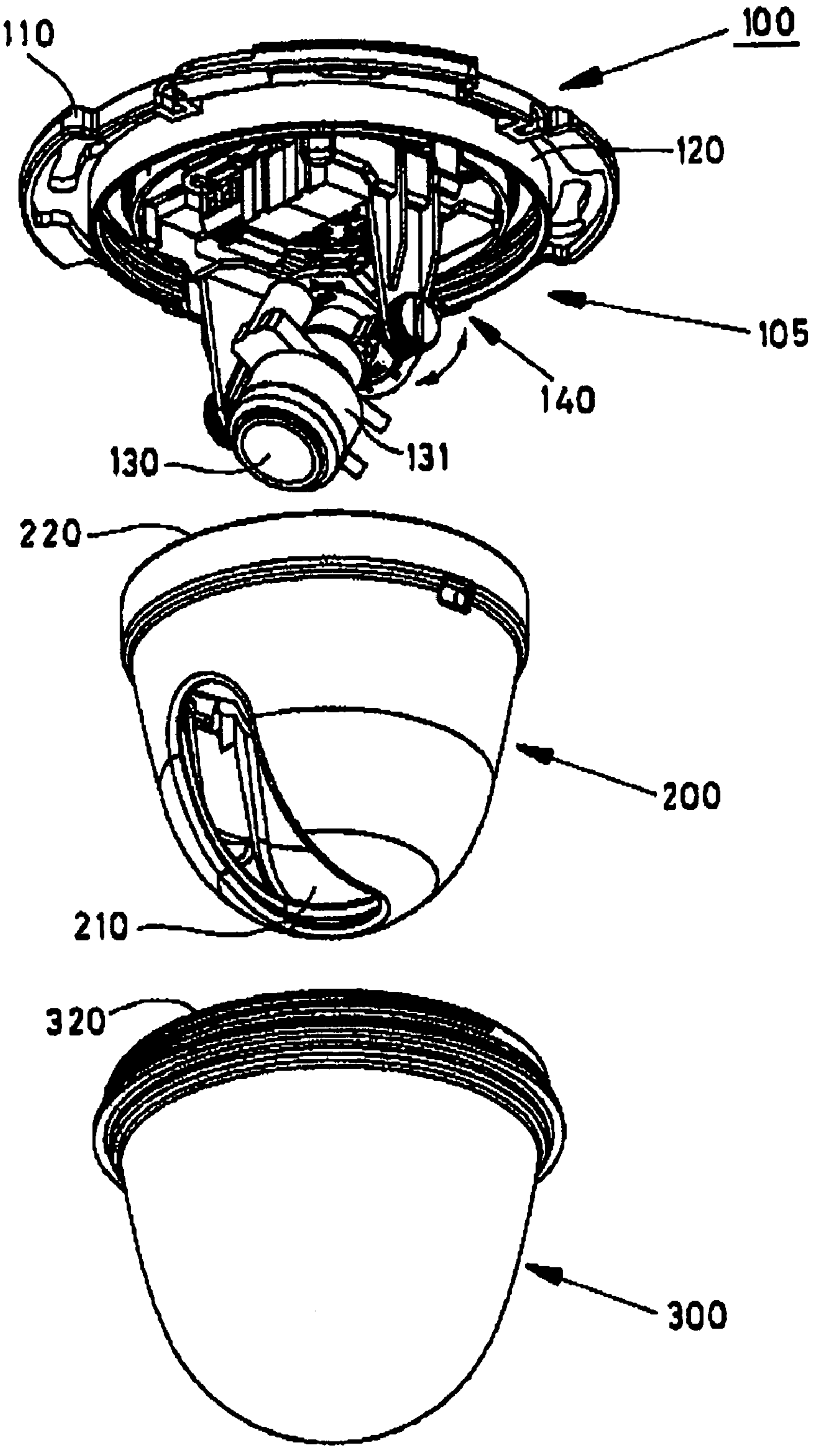
FIG. 1 is an exploded view of an observation device according to the invention.
Figure 2:
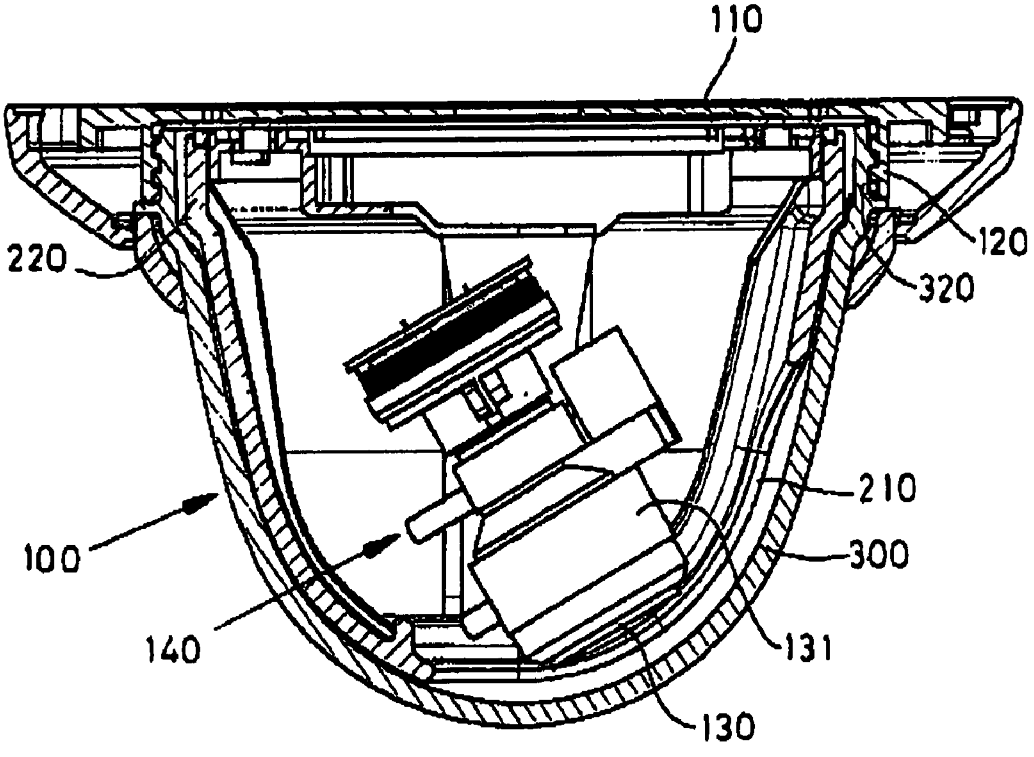
FIG. 2 is a cross-sectional view of an observation device as shown in FIG. 1, in which the observation device is shown in assembled condition.

In FIG. 1 (and in the associated cross-sectional view of FIG. 2) a first embodiment of an observation device according to the invention is shown in exploded view. The observation device 100 comprises an observation module 105 having a baseplate 110, on which a camera module 140 is mounted. The camera module 140 is fitted with optics 131 comprising a lens 130.

The camera module 140 can be manually manipulated through two (rotational) degrees of freedom so as to change the orientation of the scanning beam of the lens 130 in a desired direction.

As shown in FIG. 1, the observation device 100 according to one embodiment of the invention comprises a transparent plastic outer dome 300 having a wall thickness of less than about 5.0 mm and preferably less than about 3.2 mm. The outer dome 300 functions to protect the camera module 140, more particularly the optics 131 and the lens 130. The dome 300 has a circumferential edge 320, which is provided with external screw threads, that upon attachment to the baseplate 110 abuts against an internally threaded upright edge or flange 120 on the baseplate 110.

The observation device 100 also comprises an inner dome 200, which is disposed within the outer dome 300 and which likewise has a circumferential edge 220 for being mounted an the camera module 140 or on the baseplate 110.

The inner dome 200 has a viewing window 210, at which location the inner dome 200 is provided with an opening for allowing the scanning beam of the lens 130 to pass. The wall thickness of the inner dome is about 3.4 mm, and the material of the inner dome may be, e.g., metal, ABS, black polycarbonate, or other suitable material. Alternatively, it is possible to design the inner dome to have a closed surface, in which case the inner dome must be transparent in the field of view of the lens 130.

During use, the camera module 140 can be manually moved, together with the inner dome 200, with respect to the housing/baseplate 110. This enables rotation of the scanning beam of the lens 130 through an angle of 360°.

The thickness of the material of the outer dome 300 is preferably no greater than about 5.0 mm and more preferably is no greater than 3.2 mm. As a result, not only the loss of image caused by the presence of the outer dome is kept within bounds as much as possible, but in addition the occurrence of excessive internal stresses upon impact in the case of vandalism, which might lead to unacceptable failure of the outer dome, is prevented.

By limiting the thickness of the outer dome 300 to 3.2 mm as well, a light, small and compact observation device according to the invention is obtained. This latter aspect makes the observation device less conspicuous, so that vandals will be less likely to test the camera's resistance to vandalism.

Furthermore, the spacing between the outer side of the inner dome 200 and the inner side of the outer dome 300 is maximally about 5.0 mm. This, too, helps to keep the constructional dimensions of the observation device within reason.

Figure 3:
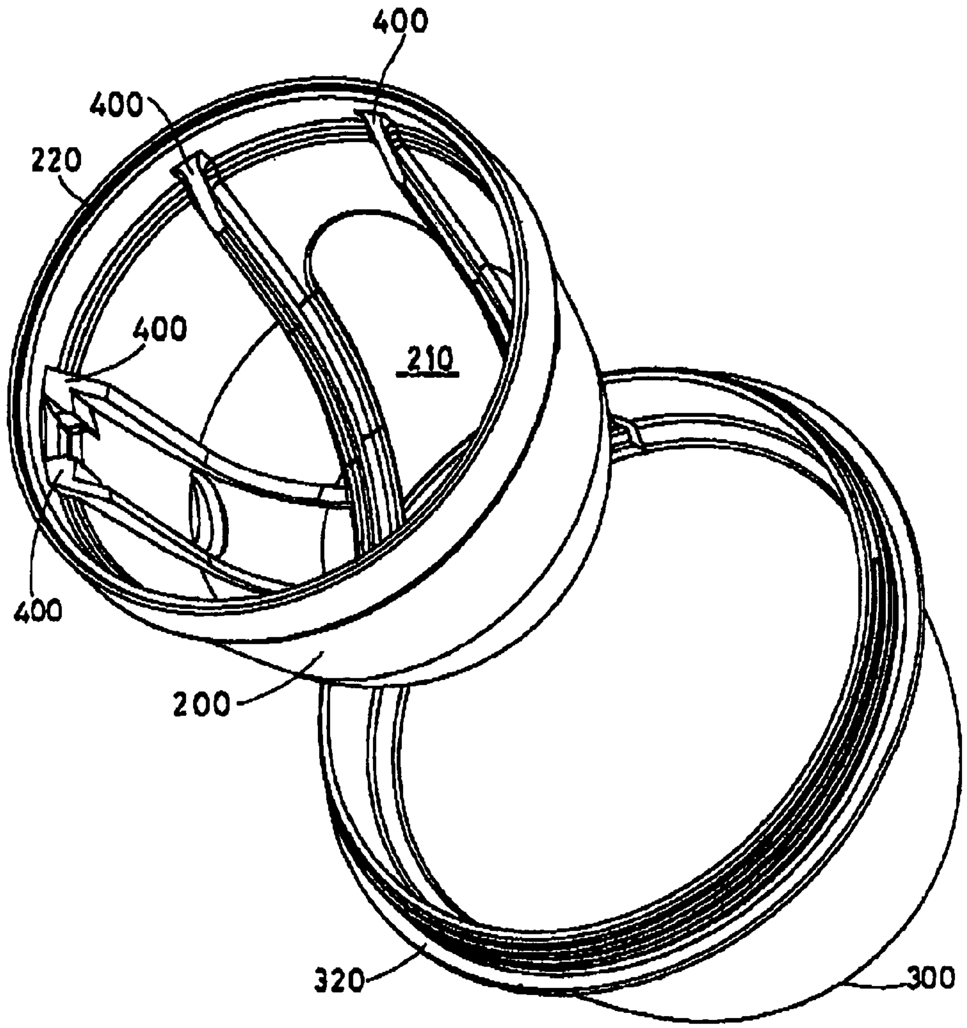
FIG. 3 is an exploded view of the inner dome and the outer dome of the observation device that is shown in FIGS. 1 and 2.

FIG. 3 is a detail view of the observation device according to the invention, showing the outer dome 300 and the inner dome 200. According to the invention, the inner dome 200 comprises several strengthening ribs 400, which are provided on the inner side of the dome and which extend along the inner side.

Said strengthening ribs 400 reduce the risk of failure/fracture of the dome 200 and thus the risk of damage to the optics 131 or the lens 130 of the camera 140 in the case of vandalism.

The ratio between (a) the maximum impact energy which the observation device 100 is capable of resisting (measured in accordance with the IEC 60068-2-75 (part 2) standard) and (b) the maximum impact energy which the observation device 100 is capable of resisting when not fitted with an inner dome 200 (measured in accordance with the same standard) is at least 1.1 and may be at least 1.5.

The invention claimed is:

1. An observation device comprising:

a housing comprising:

an outer dome having at least one transparent portion; and an inner dome disposed within the outer dome, wherein the inner dome has a variable thickness; and an optical lens having a field of view, wherein the optical lens is accommodated within the housing, wherein the outer dome is transparent in the field of view of the lens, wherein the outer dome is configured to protect the lens, wherein the observation device is resistant to impact by an object with a maximum impact energy of a first magnitude, wherein a like observation device but lacking an inner dome is resistant to impact by said object with a maximum impact energy of a second magnitude, and wherein the ratio between the first magnitude and the second magnitude is at least 1.1.

2. An observation device according to claim 1, wherein the ratio between said first magnitude and said second magnitude is at least 1.2.

3. An observation device according to claim 1, wherein a thickness of the outer dome is maximally about 5.0 mm.

4. An observation device according to claim 1, wherein a spacing between an outer side of the inner dome and an inner side of the outer dome is maximally about 5.0 mm.

5. An observation device according to claim 1, further comprising:

means for manipulating the lens.

6. An observation device according to claim 5, wherein the means for manipulating the lens are arranged for joint manipulation of the lens and the inner dome.

7. An observation device according to claim 5, further comprising:

a driver configured to drive the means for manipulating the lens.

8. The observation device according to claim 5, wherein the lens is elastically connected to the means for manipulating the lens.

9. An observation device according to claim 1, wherein the inner dome has a closed surface.

10. An observation device according to claim 1, wherein the inner dome is provided with a free passage at the field of view.

11. An observation device according to a claim 1, wherein the inner dome is at least partially made of a material selected from the group consisting of polycarbonate, ABS, and metal.

12. An observation device according to claim 1, wherein the inner dome consists of one layer.

13. An observation device according to claim 1, wherein the outer dome consists of one layer.

14. An observation device according to claim 1, wherein the inner dome is configured to be manipulated with respect to the outer dome.

15. An observation device according to claim 1, wherein the housing comprises a base element, and wherein the outer dome is attached to the base element by means of a threaded connection along a circumferential portion of the outer dome.

16. An observation device according to claim 1, wherein the ratio between said first magnitude and said second magnitude is at least 1.4.

17. An observation device according to claim 12, wherein the outer dome consists of one layer.

18. The observation device according to claim 1, wherein a wall of the inner dome includes thickened portions.

19. An observation device comprising:

a housing comprising:

an outer dome having at least one transparent portion; and an inner dome disposed within the outer dome;

an optical lens having a field of view; and means for manipulating the lens, wherein the optical lens is accommodated within the housing, wherein the outer dome is transparent in the field of view of the lens, wherein the outer dome is configured to protect the lens, wherein the observation device is resistant to impact by an object with a maximum impact energy of a first magnitude, wherein a like observation device but lacking an inner dome is resistant to impact by said object with a maximum impact energy of a second magnitude, wherein the ratio between the first magnitude and the second magnitude is at least 1.1, and wherein the lens is elastically connected to the means for manipulating the lens.

20. An observation device comprising:

a housing comprising:

an outer dome having at least one transparent portion; and an inner dome disposed within the outer dome; and an optical lens having a field of view, wherein the optical lens is accommodated within the housing, wherein the outer dome is transparent in the field of view of the lens, wherein the outer dome is configured to protect the lens, wherein the observation device is resistant to impact by an object with a maximum impact energy of a first magnitude, wherein a like observation device but lacking an inner dome is resistant to impact by said object with a maximum impact energy of a second magnitude, wherein the ratio between the first magnitude and the second magnitude is at least 1.1, and wherein the housing comprises a base element, and wherein the outer dome is attached to the base element by means of a threaded connection along a circumferential portion of the outer dome.

* * * * *